Aug. 10, 1965  YOSHIO MASUDA  3,200,255
OCEAN WAVE ELECTRIC GENERATOR
Filed Jan. 24, 1961  2 Sheets-Sheet 1
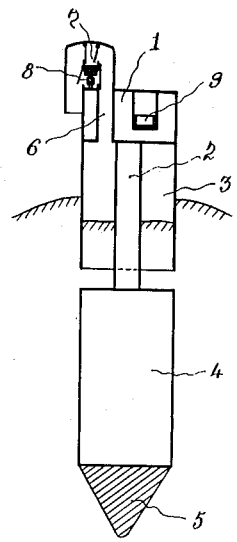
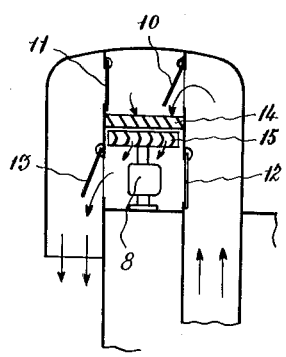
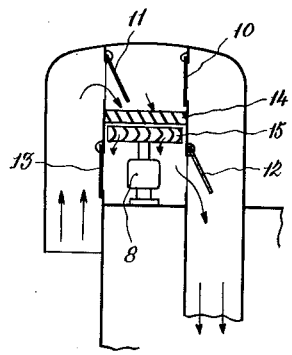
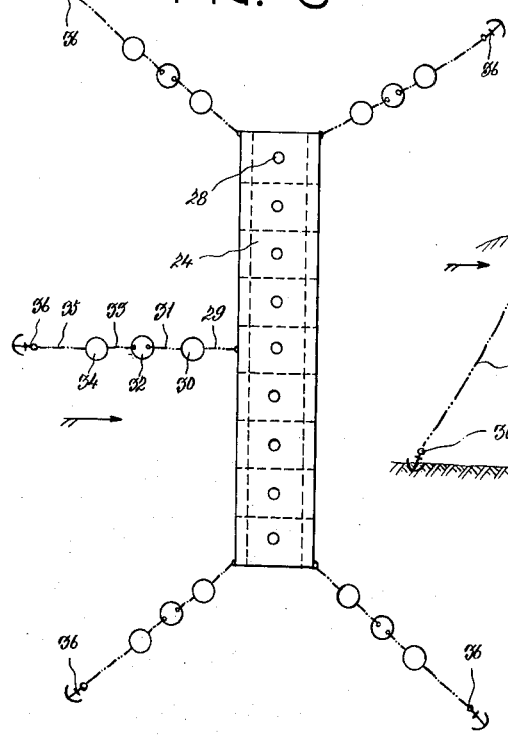
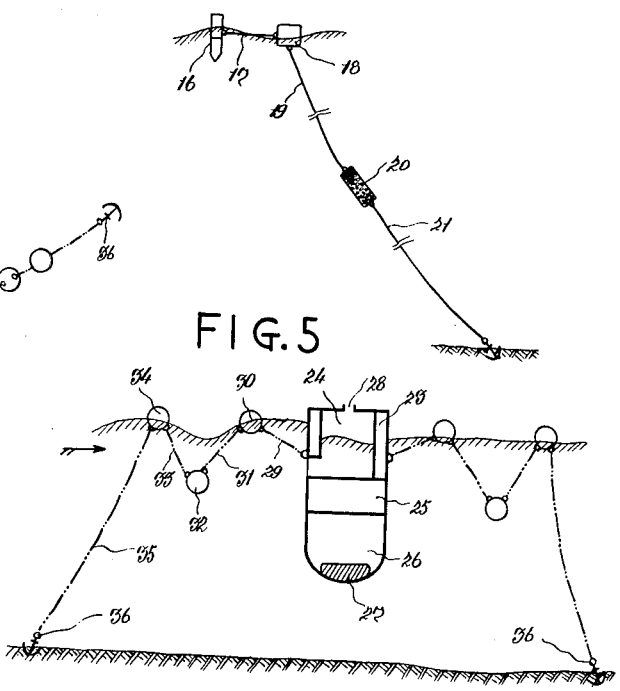
INVENTOR.
Yoshio Masuda
BY
Michael S. Striker
Attorney Aug. 10, 1965  YOSHIO MASUDA  3,200,255

OCEAN WAVE ELECTRIC GENERATOR

Filed Jan. 24, 1961

INVENTOR.
Yoshio Masuda
BY
Michael S. Striker
Attorney

United States Patent Office 3,200,255
Patented Aug. 10, 1965

3,200,255
OCEAN WAVE ELECTRIC GENERATOR
Yoshio Masuda, Tokyo, Japan, assignor of one-half to Ichiro Kanda, Kawaguchi, Saitamaken, Japan
Filed Jan. 24, 1961, Ser. No. 84,555
Claims priority, application Japan, Feb. 10, 1960, 35/4,274; Oct. 14, 1960, 35/41,199
15 Claims. (Cl. 290—42)

This invention relates to a device which changes the force of ocean waves into electric power.

One of the objects of this invention is to supply electric power to buoys or offshore stations on the ocean which have the purpose of oceanographic study, meteorological observation, fairway buoy, marine product industry, fishing and military patrol, etc. Storage batteries have been used for buoys until recently, but as their lives are relatively short, such buoys can not work for a long time without restoring the batteries. By using this "ocean wave electric generator" in which the electric power is generated by the wave energy, the buoys and offshore stations can be operated semipermanently as they automatically charge batteries.

Another object of this invention is to produce a large electric energy for island country where the ocean wave is one of the natural energy sources. It must be borne in mind that the wave energy exists at every point on the ocean and that it has much higher energy density than other natural energy sources such as wind, sunbeam or tide. At the coast of the Japan Sea, the wave height exceeds 1.2 meters for more than 240 days of the years, and the power of wave per 1 meter length of the seashore is about 30~100 kw. in the stormy weather. A large ocean wave electric generator or a large wave motor is a kind of the mobile breakwater which breaks waves by utilizing its energy. This is another object of this invention.

There are three different types of the ocean wave electric generator and its construction is different according to the individual object and application.

Type 1 is suitable for deep sea, type 2 is suitable for shallow sea, and type 3 is suitable for small buoy. The advantages and other objects of this invention will be apparent from the following description and the attached drawing.

In the drawing,

FIGURE 1 is a cross sectional view of the ocean wave electric generator type 1.

FIGURE 2 and FIGURE 3 show the mechanism of four vanes and air turbine of type 1.

FIGURE 4 is a side view showing the mooring mechanism of buoy to the very deep sea.

FIGURE 5 is a cross sectional side view showing a construction of a mobile breakwater and its mooring mechanism.

FIGURE 6 is a top view of a mobile breakwater.

Figure 7:
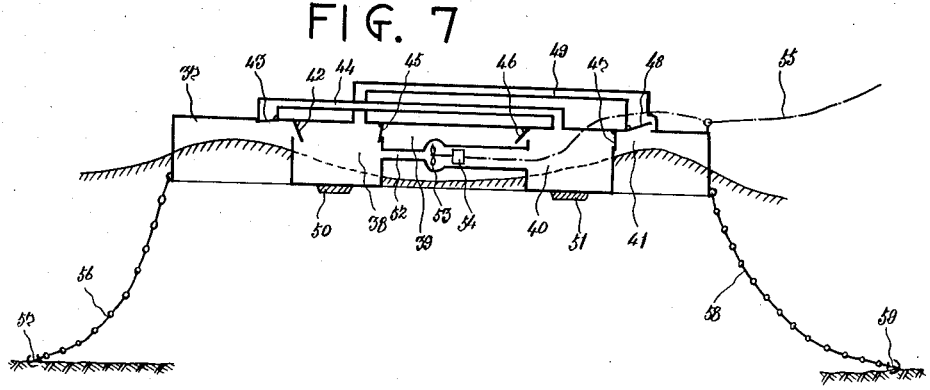
FIGURE 7 is a cross sectional side view showing a construction of an ocean wave electric generator type 2.

A buoy on the ocean is given very strong forces from the water motion of wave. One of the forces is buoyancy by the vertical motion of water surface, and the other is impacting force by the horizontal motion of water, but it is necessary to use an opposite force from the bottom of the sea in order to generate an electric power by these forces.

In a sallow sea, the opposite force is given by a mooring anchor, but it is very difficult to moor a large platform in very stormy weather. In a deep sea, it is impossible to get the opposite force by a mooring anchor.

This invention gives a solution to these problems. The ocean wave electric generator type 1 shown in FIGURE 1 generates electric power without the opposite force from the bottom of the sea. It consists of upper room 1, connection room 2, air pump room 3, lower room 4, weight 5, air pipe 6, vanes and turbine 7, electric generator 8 and storage battery 9. The disposition of each part is shown in FIGURE 1. The upper room 1 is made water-tight, and keeps air pipe 6 and storage battery 9 in it, and puts vanes and turbine 7 and electric generator 8 on it. The connection room 2 is situated between rooms 1 and 4; its horizontal sectional area is small, and it is also made watertight. The air pump room 3 is attached under the upper room 1, and its bottom opens to sea water through gape, but its head opens to the air through the air pipe 6 and the vanes and turbine 7. The lower room 4 is made watertight, and has a large buoyancy. The weight 5 is put under the lower room 4. The buoy stands vertically by the weight of 5 and the buoyancy of the rooms 2 and 4. The air pipe 6 connects the air pump room 3 with open air through the vanes and turbine 7. The vanes and turbine 7 have four vanes and turbines which are shown in FIGURES 2 and 3. The electric generator 8 is connected to the turbine of 7, and its electric output is supplied to load through the storage battery 9. These operations will be explained later.

The buoyancy of the rooms 2 and 4 is a little larger than the total weight of the apparatus, so the sea level is kept about the middle of the connection room 2. If this buoy is sunk into water and released, it will oscillate up and down, and the period $T_2$ of this oscillation is shown by the Formula 1.

$$T_2 = \frac{2\pi}{\sqrt{\frac{(S_1+S_2)\rho}{M}}} \qquad (1)$$

$T_2$: the period of natural oscillation
$\pi$: 3.14
$S_1$: horizontal section area of the connection room 2
$S_2$: horizontal section area of the air pump room 3
$\rho$: weight of a unit volume of sea water
$M$: total mass which includes the additional water surrounded by this buoy When ocean wave comes, the buoy is moved up and down by wave force. When the wave period $T_1$ is shorter than $T_2$, this buoy is almost kept immovable according to its large mass, and the relative vertical motion arises between this buoy and the wave surface. If $T_1$ is equal to $T_2$, the motion is resonant, and the relative vertical motion between this buoy and the wave surface gets bigger. If $T_1$ is longer than $T_2$, the abovementioned relative vertical motion does not arise.

The air in the air pump room 3 is compressed and expanded by the water surface as the result of this relative vertical motion between this buoy and wave surface. Therefore, the air flows from the air pump room 3 to the open air and from the open air to the air pump room 3. The vanes and turbine 7 operate by this air stream. FIGURES 2 and 3 show their actions.

One of the actions is to change air stream to the same direction by four vanes 10, 11, 12 and 13. When the air flows from the air pump room 3 to the open air as shown in FIGURE 2, the vanes 10 and 13 are opened by air pressure, but the vanes 11 and 12 are closed by air pressure, therefore the air flows through the vanes 10 and 13. On the other hand, when the air flows from the open air to the air pump room 3, the vanes 11 and 12 are opened, but the vanes 10 and 13 are closed, therefore the air flows through the vanes 11 and 12.

The other action is to rotate the turbine. The stationary blades 14 are supported by the outer cylinder, and each blade of 14 is deflected so that the gapes between each blade become small. When the air flows through these gapes, it makes the pressure on the upper side of blades 14 higher, and high speed rotating air stream arises. The curved blades 15 which are mounted on the rim of a wheel are put in this high speed air stream, and are rotated to one direction. The electric generator 8 is rotated by this motion, and it produces an electric power.

The above-mentioned mechanism is not complicated, and the movable parts are only four vanes 10, 11, 12, 13, turbine blades 15 and electric generator 8. If these parts are made of anticorrosive materials, it is possible to protect the apparatus from the corrosion by sea water.

The latest experiment of this type was conducted at the water tank of Technical Research Institute of Japanese Defense Agency in October 1960, and it succeeded in generating an electric power. From these experiments it is estimated that the electrical output will be over 1 kw. per 1 square meter of horizontal section area of buoy by a wave of 2 meters in height and 6 seconds in period, so we can provide more electric power for each usefulness in small buoy.

This ocean wave electric generator type 1 can operate without mooring mechanism, but usually it operates with a mooring mechanism. FIGURE 4 shows the mooring mechanism for a very deep sea. It consists of a buoy 16, a wire 17, a mooring buoy 18, mooring short wires 19 and deep, the mooring wire becomes very long and very heavy, and it is required that the wire has enough strength, and as the dropping speed of the anchor becomes too much by its heavy weight, the operation of dropping the anchor is very dangerous. This invention has improved these weak points. The mooring wire is separated to the mooring short wires 19 and 21 etc.; the tank 20 is put between them, and it is filled with gasoline. The volume of the gasoline is adjusted to get the same buoyancy against the weight of mooring short wire 21 before dropping, and also the pressure in tank 20 is open to the outside in order to avoid the destruction of the tank by high pressure in the deep sea. Of course, the number of tank 20 increases according to the depth of the sea, and the requirement to the wire strength does not increase by the depth of the sea, and also the dropping speed of anchor 22 is limited by the drag of the tank 20 etc. A mooring buoy 18 is put to the top of the mooring wire 19, and the buoy 16 is connected to the mooring buoy 18 by the wire 17. The buoy 16 generates an electric power from the wave energy which exists at every point on the ocean, and is used for the purpose of oceanographic study etc.

The need of reasonably calm water surface for successful engagement in marine operations such as ship salvaging, dredging, and shoreline improvement and for military amphibious operations is well recognized. The solution to this problem is to make a device which can be quickly installed to seaward of the operating area when high waves threaten to curtail or halt activities, and can provide sufficient protection from the imposed waves to permit a normal level of activity. Such device is generally called a mobile breakwater, since it combines a degree of portability with the function of the usual wave-protective structure. The large ocean wave electric generator or wave motor is a kind of the mobile breakwater. FIGURE 5 shows a cross sectional side view of it, and its dimensions are about 200 feet in width and 60 feet in height, and it consists of side rooms 23, air pump rooms 24, lower rooms 25, water rooms 26, weights 27 and nozzles 28. FIGURE 6 shows a top view of the mobile breakwater. It has many separated air pump rooms 24, and has many nozzles 28 on each air pump room 24. Small arrows show the direction of the wave. The side rooms 23 are made watertight, and their horizontal sectional areas are small. The bottom of the air pump room 24 opens to sea water through gape, and its head opens to open air through the nozzles 28. The lower room 25 is made watertight, and has a large buoyancy. The water room 26 contains sea water in it, and increases the total mass of the mobile breakwater. The weight 27 is attached under the water room 26. The buoyancy of the side rooms 23 and the lower rooms 25 is a little larger than the total weight, and so sea level is kept about the middle of the side room 23.

The motion of the mobile breakwater induced by waves is the same as in the ocean wave electric generator type 1. The wave energy is changed to the air flow through nozzles 28, and is consumed to open air.

From the latest experiment of the mobile breakwater at water tank it is concluded that 50% of the wave energy is consumed and 25% of it is reflected and wave height decreases to less than ½.

The mooring mechanism to the mobile breakwater consists of wires 29, 31, 33, 35, buoys 30, 34, weights 32 and anchors 36. It is very difficult to fix this large mobile breakwater against the impacting force of shallow sea wave, but this mooring mechanism can go back on the wave by sinking the buoys 30 and 34, and raising up the weight 32 when the wave impacts the mobile breakwater, and can reduce the force to anchor 36. It is possible to separate the force to the anchor by using many anchors which are attached with the above-mentioned mooring mechanism.

From the latest experiment of the mooring mechanism at water tank it is concluded that the force to the anchor induced by the wave can decrease to $$\frac{1}{10} \sim \frac{1}{100}$$

by the above-mentioned mooring mechanism. Of course, the mobile breakwater with the air turbine can generate a large electric power, and so it will be possible to break the wave and use its energy for many applications.

When we design the above-mentioned ocean wave electric generator in a shallow sea, the depth of sea is limited, and so it is difficult to have a large underwater mass. The ocean wave electric generator type 2 has no underwater mass and can generate a large electric power in a shallow sea.

Figure 8:
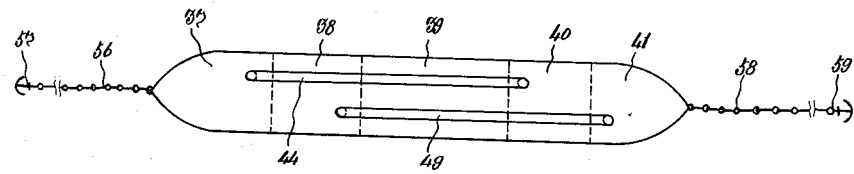
FIGURE 8 is a top view showing an ocean wave electric generator type 2.

FIGURE 7 is a cross sectional side view of it, and FIGURE 8 is a top view of it. Its body consists of front air pump room 37, front room 38, middle air pump room 39, rear room 40, rear air pump room 41, and it is about 200 feet in length and 12 feet in depth, and the width is different by the requirement to its output. The wave length of shallow sea is shorter than that of deep sea, and it is about 180 feet. Therefore the phase of wave at each room is different when the body is moored like FIGURE 7. The air in front air pump room 37 and rear air pump room 41 is compressed, but the air in middle air pump room 39 is expanded.

The front air pump room 37 has vanes 42 and 43, the middle air pump room 39 has vanes 45 and 46, the rear air pump room 41 has vanes 47 and 48, and a pipe 44 connects the front air pump room 37 with the rear room 40, a pipe 49 connects the rear air pump room 41 with the front room 38. These vanes and pipes can control the direction of flow, and air flows from each air pump room to the front room 38, and from the rear room 40 to each air pump room. Therefore the air pressure in the front room 38 becomes higher than the air pressure in the rear room 40 by the wave motion to each air pump room, and air flows from the front room 38 to the rear room 40 through pipe 52, and air turbine 53 and electric generator 54 move by this air stream. The volume of the front room 38 and the rear room 40 is large, and stores the energy of air, and so an average electric output will be expected.

The ocean wave electric generator type 2 is moored by front chain 56, front anchor 57, rear chain 58, and rear anchor 59. The weights 50 and 51 are put on the bottom of the body and keep the vertical balance. The electric power is led to seashore through an overhead wire 55.

From the latest experiment of this type at water tank it is concluded that the output of this type is almost the same as the output of type 1. This type will be usefull to an electric power source to island, but the length of the body must be longer than wave length, and so small unit of this type is not practical.

Figure 9:
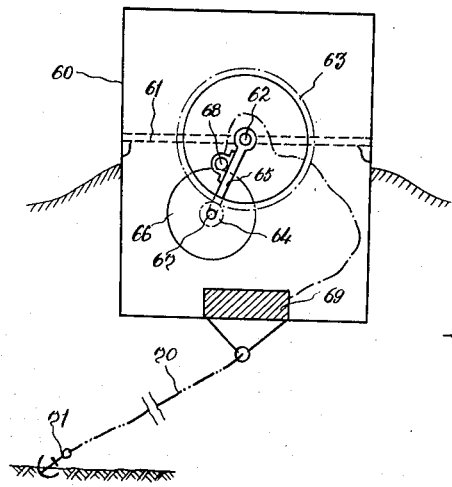
FIGURE 9 is a cross sectional side view showing a construction of an ocean wave electric generator type 3.

The ocean wave electric generator type 3 is suitable to small unit in the shallow sea. FIGURE 9 shows the cross sectional side view of it. It consists of buoy 60, supporter 61, center shaft 62, large gear wheel 63, small gear wheel 64, arm 65, fly wheel 66, outer shaft 67, electric generator 68, storage battery 69, mooring wire 70 and anchor 71.

The center shaft 62 and the large gear wheel 63 are fixed by the supporter 61 in the buoy 60. The small gear wheel 64 and the fly wheel 66 are installed to the outer shaft 67, and tht outer shaft 67 is suspended by the arm 65 from the center shaft 62, and the arm 65 can rotate around the center shaft 62, and also the small gear wheel 64 and the fly wheel 66 can rotate around axis of the outer shaft 67. The small gear wheel 64 is engaged with the large gear wheel 63, therefore the rotation of the arm 65 around the center shaft 62 causes a high rotation of the small gear wheel 64 and the fly wheel 66 around axis of the outer shaft 67. The electric generator 68 is fixed to the arm 65, and its shaft is pressed on the outer side of the fly wheel 66. Therefore the rotation of the fly wheel 66 causes a high rotation of the electric generator 68.

If the arm 65 is pulled to one side and released, it will oscillate, and the period $T_3$ of its oscillation is shown by the Formula 2.

$$T_3 = \frac{2\pi}{\sqrt{\frac{g}{(R+r)(1+i^2/r^2)}}} \quad (2)$$

$g$: gravity acceleration
$R$: the radius of the large gear wheel 63
$r$: the radius of the small gear wheel 64
$\pi$: 3.14
$i$: the radius of gyration of the fly wheel 66

$T_3$ is adjusted to the average wave period by changing the values of $R$, $r$ and $i$ in the limited space of buoy 60. This buoy 60 is moored to the bottom of the sea by the mooring wire 70 and anchor 71.

Figure 10:
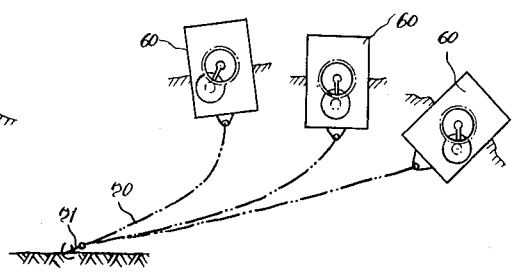
FIGURE 10 is an explanatory view showing the motion of buoy with an ocean wave electric generator type 3.

FIGURE 10 shows the motion of the buoy. The buoy moves back and forth and inclines. The force of acceleration and the force of gravity is given to the fly wheel 66 as the result of the movement and inclination of the buoy, and the arm 65 is oscillated around the center shaft 62. The oscillation period is about the same as that of wave, therefore the motion is reasonant, and it causes high rotation of the electric generator 68 through the fly wheel 66, and generates the electric power. In this case, the electric power is intermittent according to the oscillation, and so it is stored into the storage battery 69. On the other hand the weight of the storage battery 69 is necessary to keep vertical balance of the buoy.

From the latest experiment of this type made by a wave of a water tank it was approved that this type can generate an electric power. The above-mentioned mechanism can be installed in a small buoy for the purpose of fairway and fishing etc.

Although the new preferred embodiment of the present invention has been shown and described herein, it is to be understood that the invention is not to be limited hereto, for it is susceptible to changes in form and detail within the scope of the appended claims.

I claim:

1. An ocean wave machine comprising, in combination, a buoyant structure adapted to float on the water of the ocean; at least one air pump chamber positioned in said buoyant structure and having at least one opening for flow of air therethrough, said air pump chamber communicating with the water of the ocean in a region below said opening so that upon the formation of waves said water will rise and fall in said air pump chamber and act in the manner of a plunger causing flow of air through said opening; a pneumatic prime mover supported on said buoyant structure; means connecting said pneumatic prime mover to said opening of said air pump chamber so that said pneumatic prime mover will be actuated by said flow of air; and means supported on said buoyant structure and connected to be actuated by said prime mover, whereby energy transmitted by said ocean waves to air in said pump chamber will be utilized to operate said last-mentioned means.

2. An ocean wave machine comprising, in combination, a buoyant structure adapted to float on the water of the ocean; at least one air pump chamber positioned in said buoyant structure and having at least one opening for flow of air therethrough, said air pump chamber communicating with the water of the ocean in a region below said opening so that upon the formation of waves said water will rise and fall in said air pump chamber and act in the manner of a plunger causing flow of air through said opening; a pneumatic prime mover supported on said buoyant structure; means connecting said pneumatic prime mover to said opening of said air pump chamber so that said pneumatic prime mover will be actuated by said flow of air; and an electric generator supported on said buoyant structure and connected to be driven by said prime mover, whereby energy transmitted by said ocean waves to air in said pump chamber will be transformed into electric power.

3. An ocean wave machine comprising, in combination, an upright buoy adapted to float in the water of the ocean; an air pump chamber positioned in said buoy and having at least one opening for flow of air therethrough, said air pump chamber communicating with the water of the ocean in a region below said opening so that upon the formation of waves said water will rise and fall in said air pump chamber and act in the manner of a plunger causing flow of air through said opening; a pneumatic prime mover supported on said buoy; means connecting said pneumatic prime mover to said opening of said air pump chamber so that said pneumatic prime mover will be actuated by said flow of air; and means supported on said buoy and connected to be actuated by said prime mover, whereby energy transmitted by said ocean waves to air in said pump chamber will be utilized independently of reaction forces derived from the bottom of the sea and will serve to operate said last-mentioned means.

4. An ocean wave machine as set forth in claim 3, in which the upright floating buoy containing an amount of ocean water in said air pump chamber is constructed to have a natural vertical oscillating period approximately equal to the average oscillating period of passing ocean waves so as to increase the relative motion between the buoy and the ocean water by resonance.

5. An ocean wave machine comprising, in combination, an upright buoy adapted to float in the water of the ocean; an air pump chamber positioned in said buoy and communicating at its bottom with said water of the ocean so that upon the formation of waves said water will fluctuate in said pump chamber and act in the manner of a plunger upon air in said chamber; an air turbine supported on said buoy and having an inlet side and an exhaust side; a first air valve connected to permit flow of air under pressure from the top of said air pump chamber to said inlet side of the air turbine; a second air valve connected to permit flow of air under pressure from said exhaust side of the air turbine to the atmosphere; a third air valve connected to permit flow of air under suction from the atmosphere to said inlet side of the air turbine; a fourth air valve connected to permit flow of air under suction from said exhaust side of the air turbine to the top of said air pump chamber; whereby when said water rises in said pump chamber air will be caused to flow under pressure through said first air valve and through said air turbine from the inlet side to the exhaust side thereof and finally through said second air valve, and when said water descends in said pump chamber air will be caused to flow under suction through said third air valve and through the air turbine again from the inlet side to the exhaust side thereof and finally through said fourth air valve to actuate said air turbine continuously while waves are continuously formed; and an electric generator supported on said buoy and connected to be driven by said air turbine so that energy transmitted by said waves to air in said pump chamber will be converted to electric power independently of any forces derived from the bottom of the sea.

6. An ocean wave machine as set forth in claim 5, in which said inlet and outlet valves are of the flap type.

7. An ocean wave machine as set forth in claim 5, in which said upright buoy comprises a lower section including a ballast weight at its bottom and a watertight buoyancy chamber above said ballast weight; an upper section having said air pump chamber therein and carrying said valves and said air turbine as well as said electric generator; and connecting means securing said lower section to said upper section with the weight distribution being such that said water will normally fill approximately half the pump chamber.

8. An ocean wave machine as set forth in claim 6, in which said connecting means is hollow and watertight and communicates with said buoyancy chamber so as to contribute to the buoyancy effect.

9. An ocean wave machine comprising, in combination, an elongated buoyant structure adapted to float on shallow ocean water and having a front end and a rear end; at least one air pump chamber at the front end of said buoyant structure, and at least one air pump chamber at the rear end of said buoyant structure, each of said air pump chambers having a plurality of openings therein for flow of air, and each of said air pump chambers communicating below said openings with the water of the ocean so that upon the formation of waves said water will rise and fall in each of said air pump chambers and act in the manner of a plunger therein causing flow of air through said openings; a pneumatic prime mover positioned on said buoyant structure and having an air inlet compartment and an exhaust compartment; means connecting said pneumatic prime mover to said openings of said air pump chambers so that said pneumatic prime mover will be actuated by said flow of air; and means supported on said buoyant structure and connected to be actuated by said prime mover, whereby energy transmitted by said ocean waves to air in said pump chambers will be utilized to operate said last mentioned means.

10. An ocean wave machine comprising, in combination, an elongated buoyant structure adapted to float on shallow ocean water with its front end facing oncoming waves, said buoyant structure being secured in place by mooring; at least one air pump chamber at the front end of said buoyant structure, and at least one air pump chamber at the rear end of said buoyant structure, each of said air pump chambers having a plurality of openings therein for flow of air, and each of said air pump chambers communicating below said openings with the water of the ocean so that upon the formation of waves said water will rise and fall in each of said air pump chambers and act in the manner of a plunger therein causing flow of air through said openings; an air turbine positioned on said buoyant structure intermediate said front and rear pump chambers and having an air inlet compartment and an exhaust compartment; means connecting said air turbine to said openings so that said air turbine will be actuated by said flow of air; and an electric generator supported on said buoyant structure and connected to be driven by said air turbine, whereby energy transmitted by said ocean waves to air in said pump chambers will be converted to electric power.

11. An ocean wave machine as set forth in claim 10, in which the distance from said front end of the buoyant structure to said rear end thereof exceeds the normal wave length in said shallow ocean water.

12. An ocean wave machine comprising, in combination, an elongated buoyant structure adapted to float on shallow ocean water with one of its ends facing oncoming waves; a first air pump chamber and a second air pump chamber in said buoyant structure, each of said air pump chambers communicating at its bottom with the water of the ocean so that upon the formation of waves said water will fluctuate in said air pump chambers and act in the manner of a plunger upon air in said pump chambers, said chambers being spaced from each other along the length of said buoyant structure by a distance such that when one phase of a wave of average length enters one of said chambers, the opposite phase of said wave will enter the other of said chambers; a pneumatic prime mover supported on said buoyant structure and having an air inlet compartment and an exhaust compartment; a first air valve connected to permit flow of air under pressure from the top of said first air pump chamber to said inlet compartment of the pneumatic prime mover; a second air valve connected to permit flow of air from said exhaust compartment of the pneumatic prime mover to the top of said second air pump chamber; a third air valve connected to permit flow of air under pressure from the top of said second air pump chamber to said inlet compartment of the pneumatic prime mover; a fourth air valve connected to permit flow of air from said exhaust compartment of the pneumatic prime mover to the top of said first air pump chamber; whereby when said water rises in said first air pump chamber and simultaneously descends in said second air pump chamber air will be caused to flow through said first air valve and through said pneumatic prime mover from the inlet compartment to the exhaust compartment thereof and finally through said second air valve, and when said water rises in said second air pump chamber and descends in said first air pump chamber air will be caused to flow through said third air valve and through said pneumatic prime mover again from the inlet compartment to the exhaust compartment thereof and finally through said fourth air valve to actuate said pneumatic prime mover continuously while waves are continuously formed; and means supported on said buoyant structure and connected to be actuated by said prime mover so that energy transmitted by said ocean waves to air in said pump chambers will be utilized to operate said last mentioned means.

13. An ocean wave machine comprising, in combination, an elongated buoyant structure adapted to float on shallow ocean water with its front end facing oncoming waves and having a length exceeding the length of an average wave; a front air pump chamber at the front end of said buoyant structure, an intermediate air pump chamber between the front and rear ends of said buoyant structure, and a rear air pump chamber at the rear end of said buoyant structure, each of said air pump chambers communicating at its bottom with the water of the ocean so that upon the formation of waves said water will fluctuate in said air pump chambers and act in the manner of a plunger upon air in said pump chambers, the phase of said average wave being the same in said front and rear air pump chambers but being opposite in said intermediate air pump chamber; an air turbine supported on said buoyant structure and having an air inlet compartment and an air exhaust compartment; first air valve means connected to permit flow of air under pressure from the top of said front and rear air pump chambers to said inlet compartment of the air turbine; second air valve means connected to permit flow of air from said exhaust compartment of the air turbine to the top of said intermediate air pump chamber; third air valve means connected to permit flow of air under pressure from the top of said intermediate air pump chamber to said inlet compartment of the air turbine; fourth air valve means connected to permit flow of air from said exhaust compartment of the air turbine to the top of said front and rear air pump chambers; whereby when said water rises in said front and rear pump chambers and simultaneously descends in said intermediate pump chamber air will be caused to flow through said first air valve means and through said air turbine from the inlet compartment to the outlet compartment thereof and finally through said second air valve means, and when said water rises in said intermediate pump chamber and simultaneously descends in said front and rear pump chambers air will be caused to flow through said third air valve means and through the air turbine again from the inlet compartment to the exhaust compartment thereof and finally through said fourth air valve means to actuate said turbine continuously while waves are continuously formed; and an electric generator supported on said buoyant structure and connected to be driven by said air turbine so that energy transmitted by said waves to air in said pump chambers will be converted to electric power.

14. An ocean wave machine as set forth in claim 13, in which each of said first and fourth air valve means comprises a pair of flap type valves, one of the flap type valves of each pair being connected to said front air pump chmber and the other of the flap type valves of each pair being connected to said rear air pump chamber, and in which each of said second and third valve means connected to said intermediate air pump chamber comprises a flap type valve.

15. An ocean wave machine as set forth in claim 13, including a tubular member extending through and separated from said intermediate air pump chamber, said tubular member housing said air turbine and said electric generator.

References Cited by the Examiner
UNITED STATES PATENTS

| | | | |
|---|---|---|---|
| 472,398 | 4/92 | Rosenholz | 290—53 |
| 1,082,746 | 12/13 | Hemmenway | 290—42 |
| 1,448,029 | 3/23 | Larry et al. | 290—53 |
| 3,064,137 | 11/62 | Corbett et al. | 290—53 |

FOREIGN PATENTS

| | | |
|---|---|---|
| 219,323 | 1/25 | Great Britain. |
| 923,131 | 2/47 | France. |

ORIS L. RADER, *Primary Examiner.*

MILTON O. HIRSHFIELD, JOHN F. COUCH,
*Examiners.*